N. M. PHILLIPS.
Electro Magnetic Scales.
No. 14,733.        Patented April 22, 1856.
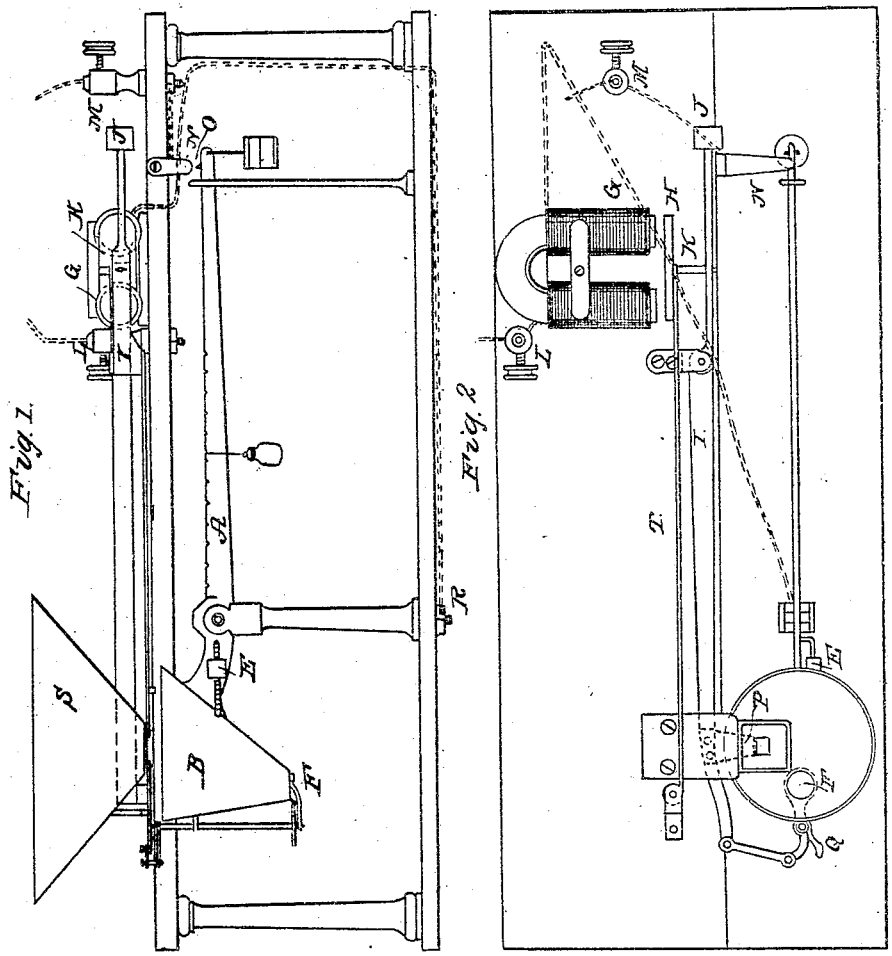

UNITED STATES PATENT OFFICE.

NATHAN M. PHILLIPS, OF NEW YORK, N. Y.

ELECTRO-MAGNETIC GRAIN-SCALE.

Specification forming part of Letters Patent No. 14,733, dated April 22, 1856.

*To all whom it may concern:*

Be it known that I, NATHAN M. PHILLIPS, of the city, county, and State of New York, have invented a new and useful Improvement on Scales for Weighing Grain, which I designate the "Electro-Magnetic Grain-Scale;" and I do hereby declare that the following is a full and exact description thereof, reference being had to the accompanying drawings, and to the letters of reference marked thereon, in which—

Figure 1 is a perspective view and Fig. 2 a plan, similar letters in each referring to similar parts.

The nature of my invention consists in attaching to the hopper of a grain-scale a valve which is opened by the action of an electro-magnet when the requisite amount of grain is contained in it, so that grain can be weighed by this improvement with great exactness and celerity.

My improvement can be attached to any desired style of weighing apparatus that is used for weighing grain; but it is represented in the drawings as attached to a lever scale-beam.

A is an ordinary lever scale-beam, with the hopper B attached to the short end to contain the grain to be weighed; E, movable weight to balance and adjust the scale; F, discharging-valve to hopper; G, electro-magnet; H, the armature of the magnet; I, lever attached to and worked by the armature H and the connecting-rod K to close the valve P (at the mouth of the bin) and open F; J, compensating-weight to balance the weight of the lever I; L, connecting-cup of the positive pole of the galvanic battery; M, connecting-cup of the negative pole of the galvanic battery; N, platina spring to form the connection with the poles of the battery at the platina point O at the end of the scale-beam; P, valve at the mouth of the grain-bin; Q, lever (worked by the operator) to close the valve F, open the valve P, and relieve the armature H from the electro-magnet G; S, the bin for containing the supply of grain to be weighed; T, rod attached to the armature H for the purpose of preserving its parallelism to the ends of the magnet G.

The electric current passes from the positive pole of the battery to L; thence around the magnet and through the connecting-wire to the scale at R. When the requisite weight of grain is received in the hopper B the beam A rises, forming a connection at the platina point O and spring N with the negative pole M of the battery, completing the electric circuit. The connection and circuit being formed as above causes the magnet G to attract the armature H, moving the lever I, closing the valve P, and opening the valve F, discharging the grain into a bag or other receptacle. The valve F is closed and the valve P opened by the operator, and the operation repeated as before.

What I claim as my invention, and desire to secure by Letters Patent, is—

The application of an electro-magnet to open and close the valves of a scale for weighing grain by making a connection between the positive and negative poles of a galvanic battery by means of the tilting or raising of the beam, as herein described, and for the purposes set forth, or any analogous arrangement substantially the same.

NATHAN M. PHILLIPS.

Witnesses:
SAMUEL NOWLAN,
FRANCIS S. LOW.